United States Patent
Wu

(10) Patent No.: US 9,461,815 B2
(45) Date of Patent: Oct. 4, 2016

(54) VIRTUALIZED AES COMPUTATIONAL ENGINE

(71) Applicant: Advanced Micro Devices, Inc., Sunnyvale, CA (US)

(72) Inventor: Winthrop J. Wu, Shrewsbury, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 119 days.

(21) Appl. No.: 14/057,722

(22) Filed: Oct. 18, 2013

(65) Prior Publication Data
US 2015/0113268 A1 Apr. 23, 2015

(51) Int. Cl.
H04L 29/00 (2006.01)
H04L 9/06 (2006.01)
H04L 29/06 (2006.01)
G09C 1/00 (2006.01)

(52) U.S. Cl.
CPC .............. *H04L 9/0631* (2013.01); *G09C 1/00* (2013.01); *H04L 63/0457* (2013.01); *H04L 2209/12* (2013.01)

(58) Field of Classification Search
CPC ............ H04L 9/0631; H04L 63/0457; H04L 2209/12; G09C 1/00
See application file for complete search history.

(56) References Cited

U.S. PATENT DOCUMENTS

| | | | |
|---|---|---|---|
| 7,657,757 B2 * | 2/2010 | Feldman | H04L 9/12 713/191 |
| 8,516,427 B2 * | 8/2013 | Kelem | G06F 15/7867 716/126 |
| 2004/0205336 A1 * | 10/2004 | Kessler et al. | 713/160 |
| 2005/0138368 A1 * | 6/2005 | Sydir et al. | 713/161 |
| 2005/0141715 A1 * | 6/2005 | Sydir et al. | 380/255 |
| 2005/0276413 A1 * | 12/2005 | Neogi | 380/28 |
| 2006/0242385 A1 * | 10/2006 | Murakami | G06F 9/30145 712/200 |
| 2007/0098153 A1 * | 5/2007 | Nishikawa | H04L 9/0631 380/30 |
| 2007/0192571 A1 * | 8/2007 | Feghali et al. | 712/220 |
| 2007/0195949 A1 * | 8/2007 | Okochi | G06F 21/558 380/28 |
| 2008/0170686 A1 * | 7/2008 | Nemoto | H04L 9/0637 380/42 |
| 2008/0317249 A1 * | 12/2008 | Bates et al. | 380/255 |
| 2009/0132821 A1 * | 5/2009 | Matsuzaki | H04L 9/0877 713/170 |
| 2010/0275035 A1 * | 10/2010 | Manabe | 713/189 |
| 2010/0278338 A1 * | 11/2010 | Chang | G09C 1/00 380/200 |
| 2012/0060159 A1 * | 3/2012 | Sydir et al. | 718/100 |
| 2013/0227301 A1 * | 8/2013 | Sarcone | 713/189 |

(Continued)

OTHER PUBLICATIONS

Pub, NIST FIPS. "197." Announcing the Advanced Encryption Standard (AES) (2001).

(Continued)

*Primary Examiner* — Michael Pyzocha
(74) *Attorney, Agent, or Firm* — Liang & Cheng, PC

(57) ABSTRACT

A computational engine may include an input configured to receive a first data packet and a second data packet, a context memory configured to store one or more contexts, and a set of computational elements coupled with the input and coupled with the context memory. The set of computational elements may be configured to generate a first output data packet by executing a first sequence of cryptographic operations on the first data packet, and generate a second output data packet by executing a second sequence of cryptographic operations on the second data packet and on a selected context of the one of the one or more contexts. The selected context may be associated with the second packet of data, and the context may be stored in the context memory prior to the execution of the first sequence of cryptographic operations.

20 Claims, 15 Drawing Sheets

(56) References Cited

U.S. PATENT DOCUMENTS

| | | | |
|---|---|---|---|
| 2014/0006805 A1* | 1/2014 | Colp | G06F 12/1425 713/193 |
| 2014/0281390 A1* | 9/2014 | Boland et al. | 712/207 |
| 2014/0344826 A1* | 11/2014 | Wu | 718/104 |
| 2015/0046702 A1* | 2/2015 | Paaske et al. | 713/160 |

OTHER PUBLICATIONS

Dworkin, Morris. "NIST Special Publication 800-38A," Recommendation for Block Cipher Modes of Operation: Methods and Techniques", 2001."

Dworkin, Morris. "Recommendations for Block Cipher Modes of Operation: The CMAC Mode for Authentication (Special Publication 800-38B)." (2005).

Dworkin, Morris. "Recommendations for Block Cipher Modes of Operation: Galois/Counter Mode and GMAC (NIST Special Publication 800-38D)." NIST special publication 800 (2007): 38D.

IEEE 1619 Security in Storage Working Group. "IEEE P1619/D19: Standard for cryptographic protection of data on block-oriented storage devices." (2007).

Dworkin, Morris. "800-38E: Recommendation for Block Cipher Modes of Operations: The XTS-AES Mode for Confidentiality on Storage Devices." NIST Special Publication. (2009).

* cited by examiner ns. A typical 25 instances, well-known components or methods are not
VIRTUALIZED AES COMPUTATIONAL ENGINE

TECHNICAL FIELD

This disclosure relates to the field of encryption and, in particular, to a computational engine for performing cryptographic operations.

BACKGROUND

In addition to a central processing unit (CPU), a computer system may in some cases utilize a coprocessor for performing additional functions. For example, a coprocessor may be used to perform such operations as floating point arithmetic, graphics operations, signal processing, string processing, encryption, compression, and interfacing with peripheral devices. Coprocessors may thus be optimized for performing specific types of calculations efficiently, and may increase overall system performance by offloading processor-intensive tasks from the CPU.

A coprocessor may be used to process a heterogeneous workload that may include several different types of computations, each having its own unique set of computational requirements, such as data size or processing time. A typical architecture may execute such heterogeneous workloads by relying on software management to execute multiple workloads sequentially using a single or multiple hardware engines. However, the different computational requirements presented by a heterogeneous workload may make it difficult to execute using such a system; different computational (data) sizes or computational time may add significant complexity as compared to homogeneous workloads.

BRIEF DESCRIPTION OF THE DRAWINGS

The present disclosure is illustrated by way of example, and not by way of limitation, in the figures of the accompanying drawings.

DETAILED DESCRIPTION

Figure 1:
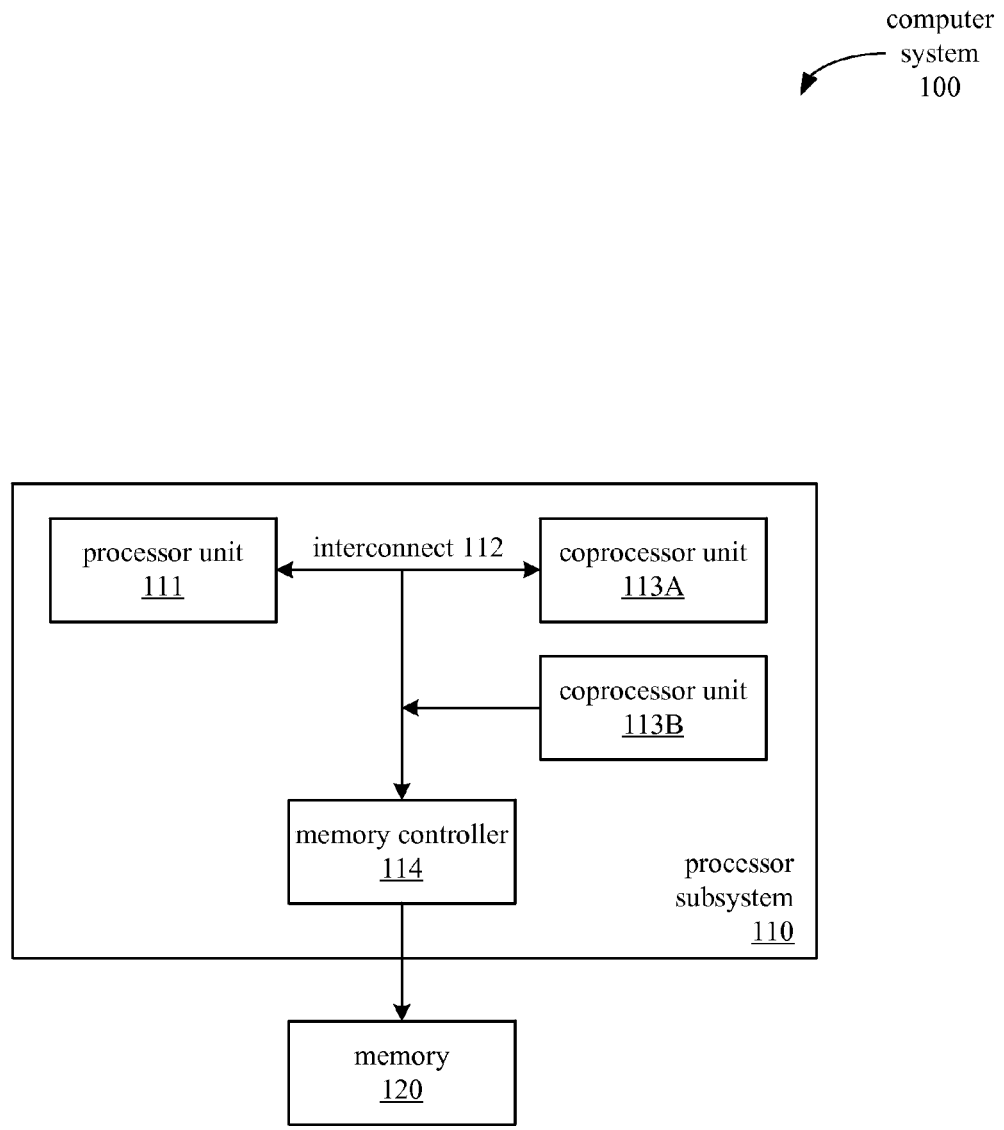
FIG. 1 illustrates an embodiment of a computer system.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

One embodiment of an architecture for managing a heterogeneous workload that presents multiple data streams for computation may allow such multiple data streams to be processed concurrently without external supervision by a processor or host system. Specifically, the data streams may be processed by functions executing concurrently on multiple hardware engines. In one embodiment, the hardware engines may be fixed-function engines (FFEs) that are optimized for performing specific functions or sets of calculations.

In one embodiment, a FFE may be a computational engine that is capable of switching between different modes of a certain type of task; for example, an Advanced Encryption Standard (AES) computational engine may be capable of switching between different National Institute of Standards and Technology (NIST) approved cipher modes, such as ECB, CBC, CFB, OFB, CTR, XTS-AES-128, and CMAC. In one embodiment, such a computational engine may switch between two or more data streams, where each data stream is to be processed according to a different mode.

In one embodiment, the computational engine may also be capable of switching between multiple data streams being processed using the same cipher mode, where each of the multiple data streams retains its own set of information from previous operations. For example, for some of the above-listed NIST cipher modes, the processing of a block may be performed using an intermediate value from the processing of a previous block. The computational engine would thus be able to process two or more data streams using the same cipher mode, while using the correct intermediate values to perform the cryptographic operations for each data stream.

In one embodiment, a unified architecture for a computational engine may include a single set of shared computational elements (such as multiplexers, XOR modules, counters, etc.) to implement multiple modes. In one embodiment, each of the supported modes may correspond to a computational pathway that includes a particular subset of the computational elements, while excluding unused elements. In one embodiment, the computational engine may be an AES encryption/decryption engine that performs a series of cryptographic operations on 16-byte blocks. Such an AES engine may, for one or more of its supported cipher modes, store and update an internal state, or context, between sequential 16-byte blocks of the same datastream.

FIG. 1 illustrates an embodiment of a computer system 100 which may implement a workload management architecture with one or more computational engines, as described above. Computer system 100 may include a processor subsystem 110 coupled with memory 120. Computer system 100 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 100 may also be any type of networked peripheral device such as storage devices, switches, modems, routers, etc. Although a single computer system 100 is shown in FIG. 1 for convenience, system 100 may also be implemented as two or more computer systems operating together.

In one embodiment, processor subsystem 110 may include one or more processors or processing units. For example, processor subsystem 110 may include one or more processor units, such as processor unit 111, that are coupled to one or more coprocessor units (e.g., coprocessor units 113A and 113B). In various embodiments, processor subsystem 110 (or each processor unit within 110) may contain a cache or other form of on-board memory.

Memory 120 is coupled with processor subsystem 110 and is usable by processor subsystem 110. Memory 120 may be implemented using different physical memory media, such as hard disk storage, floppy disk storage, removable disk storage, flash memory, random access memory (RAM-SRAM, EDO RAM, SDRAM, DDR SDRAM, etc.), read-only memory (PROM, EEPROM, etc.), and so on. In one embodiment, the available memory in computer system 100 is not limited to memory 120. Rather, computer system 100 may be said to have a "memory subsystem" that includes various types/locations of memory. For example, the memory subsystem of computer system 100 may, in one embodiment, include memory 120, cache memory in processor subsystem 110, and storage on various I/O devices (e.g., a hard drive, storage array, etc.). Thus, the phrase "memory subsystem" may represent various types of possible memory media that can be accessed by computer system 100. In some embodiments, the memory subsystem stores program instructions executable by processor subsystem 110.

Processor subsystem 110 includes a processor unit 111, coprocessor units 113A and 113B, and a memory controller 114, all coupled together via an interconnect 112 (e.g., a point-to-point or shared bus circuit). In one embodiment, processor unit 111 and coprocessor units 113A and 113B may be located on the same die. In an alternative embodiment, processor unit 111 and coprocessor units 113A and 113B may be located on separate dies. In one embodiment, coprocessor unit 113B and memory controller 114 may be omitted from the processor subsystem 110. For example, processor unit 111 may be coupled only to a single coprocessor unit (e.g., 113A); alternatively, processor unit 111 may be coupled to multiple coprocessor units (e.g., 113A and 113B). Additional coprocessor units may be possible in other embodiments. In various embodiments, processor unit 111 and coprocessor units 113A and 113B may share a common memory controller 114. Memory controller 114 may be configured, for example, to access a main system memory (e.g., memory 120). In other embodiments, each processor unit 111 and coprocessor units 113A and 113B may be coupled to respective memory controllers.

In one embodiment, processor unit 111 is a general-purpose processor unit (e.g., a central processing unit (CPU)) that may include one or more execution units. Alternatively, unit 111 may be a special-purpose processor such as a graphics processor. In one embodiment, processor unit 111 may be configured to execute instructions fetched from memory 120 using memory controller 114. The architecture of unit 111 may have various features; for example, it may be pipelined. In other embodiments, processor unit 111 may implement a multithreaded architecture for simultaneously executing multiple threads. Processor unit 111 may execute, without limitation, application-specific instructions as well as operating system instructions. These instructions may allow the implementation of any number of features, including, as just one example, virtual memory.

In one embodiment, processor unit 111 maybe coupled as a companion processor to one or more coprocessor units 113A and 113B, permitting unit 111 to provide instructions to coprocessor units 113A and 113B. Instructions provided by processor unit 111 to coprocessor units 113A and 113B may be within a common instruction stream (i.e., unit 111 fetches instructions to execute and provides certain of those fetched instructions to unit 113A and 113B for execution). Certain instructions provided from processor unit 111 to coprocessor unit(s) 113A and 113B may be "control" instructions generated by a functional unit within processor unit 111 to control the operation of coprocessor unit(s) 113A and 113B.

In one embodiment, coprocessor units 113A and 113B may be used to help perform the work of processor unit 111. As with processor unit 111, coprocessor units 113A and 113B are not limited to any particular function or architecture. In various embodiments, coprocessor units 113A and 113B may be general-purpose or special-purpose processors (e.g., graphics processor units (GPU), video decoding processors, encryption processors, queue managers, etc.). In one embodiment, coprocessor units 113A and 113B may be implemented as a field-programmable gate array (FPGA). In some embodiments, coprocessor units 113A and 113B may be pipelined. Coprocessor units 113A and 113B may, in some embodiments, employ a multithreaded architecture. In various embodiments, coprocessor units 113A and 113B may be configured to execute microcode instructions in order to perform certain instructions received from unit 111. In certain embodiments, coprocessor units 113A and 113B may support the use of virtual memory.

In one embodiment, interconnect 112 may be a shared bus circuit that couples processor unit 111 to coprocessor units 113A and 113B. In one embodiment, interconnect 112 may implement a "virtual tunnel" that allows processor unit 111 to communicate with coprocessor units 113A and 113B via a packet-based protocol such as Hyper Transport or PCI-Express. In some embodiments, interconnect 112 may be a front-side bus. In one embodiment, coprocessor units 113A and 113B may be coupled to processor unit 111 through a Northbridge-type device.

In one embodiment, memory controller 114 is configured to provide an interface for processor unit 111 and/or coprocessor units 113A and 113B to access memory (e.g., memory 120). Memory controller 114 may be used, for example, to fetch instructions or to load and store data. In one embodiment, processor unit 111 may use memory controller 114 to fetch instructions for execution in processor unit 111 or coprocessor units 113A and 113B. In another embodiment, a coprocessor unit 113A or 113B may use memory controller 114 to fetch its own instructions or data.

Figure 2:
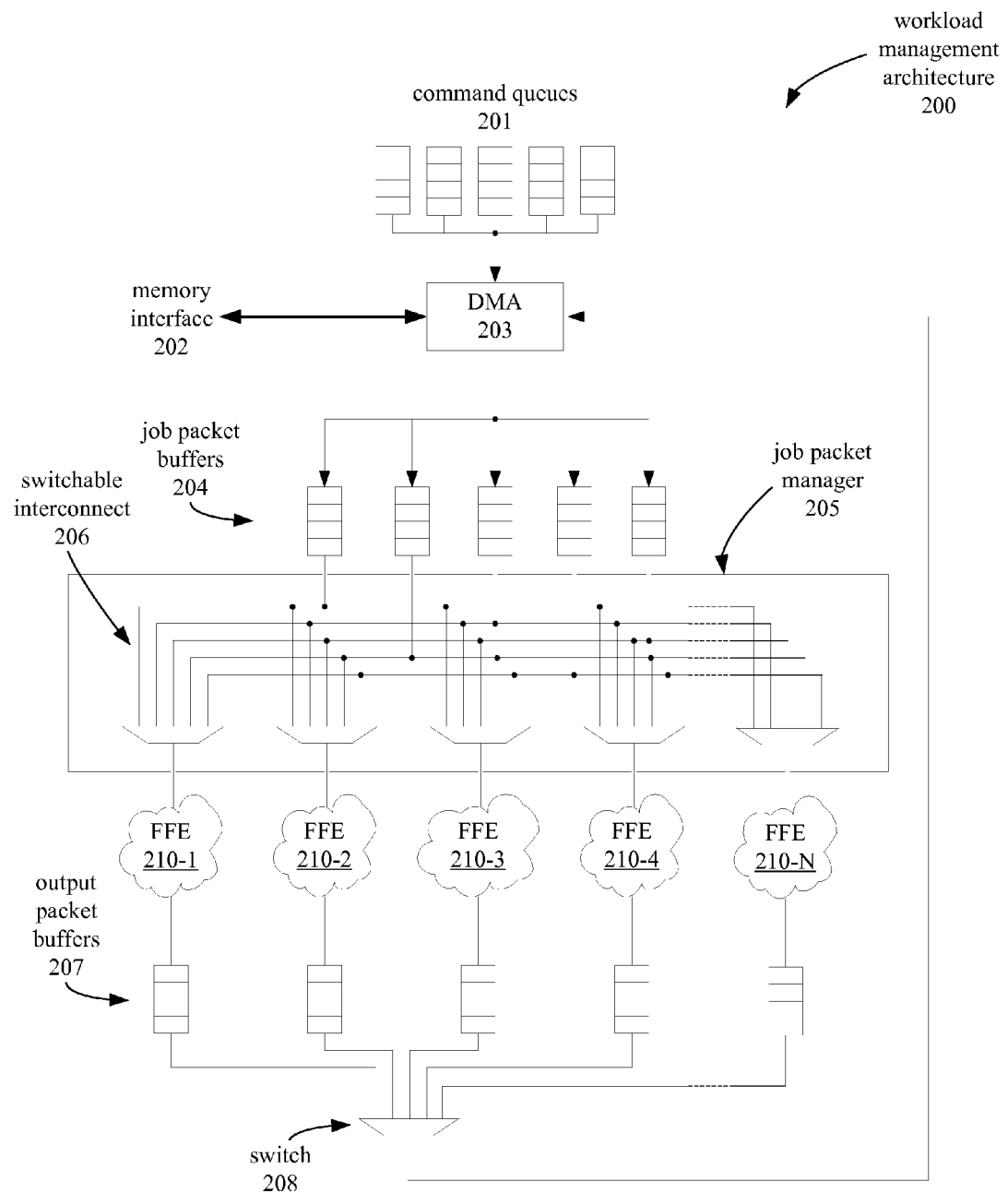
FIG. 2 illustrates an embodiment of a workload management architecture.

FIG. 2 illustrates a workload management architecture 200, according to an embodiment, which may be implemented in a coprocessor such as coprocessor unit 113A or 113B, and which may include one or more computational engines, such as fixed function engines (FFEs) 210-1 to 210-N. In alternative embodiments, the workload management architecture 200 is not limited to coprocessor implementations, and may be implemented in other types of processors or devices; for example, the architecture 200 may be implemented in a processor unit such as processor unit 111 in a processor subsystem 110 that may or may not include coprocessor units 113A and 113B. In one embodiment, the workload management architecture may be implemented in a single block of a single integrated circuit chip.

In one embodiment, the architecture 200 may include a set of command queues 201, which are coupled with an input of a direct memory access (DMA) block 203. In one embodiment, the DMA block 203 may be further coupled with a number of job packet buffers 204, which are in turn coupled with a job packet manager 205. The job packet manager 205 may be coupled with each of a set of N fixed-function engines (FFEs) 210-1 to 210-N. Each of the FFEs may have an output connected to a corresponding output packet buffer 207. Each of the output packet buffers 207 is connected via a switch 208 to the DMA block 203. In one embodiment, the components of workload management architecture 200 may be constructed on the same semiconductor substrate. For example, the components, including the DMA block 203, the job packet manager 205, the FFEs 210, and other components may be constructed as part of a coprocessor on a single semiconductor chip.

In one embodiment, each of the command queues 201 is a data structure (such as a linked list, stack, table, etc.) or other memory that can be used to contain control information and data associated with one or more commands in a single workload. In one embodiment, a workload may reside in one and only one of the command queues 201 at a given time. Thus, with n command queues 201, the architecture 200 may support n simultaneous workloads. Each of the n workloads may be heterogeneous, homogeneous, or a combination of both heterogeneous and homogeneous workloads. In one embodiment, the command queues 201 may be implemented as first-in-first-out (FIFO) buffers.

In one embodiment, the DMA block 203 performs the fragmentation of the workload data into a stream of job packets and reassembling the resulting output stream in memory (via memory interface 202) after the job packets have been processed. In one embodiment, the command queues 201 may be coupled to the DMA block 203 such that the DMA block 203 can receive the workload data and control information from the command queues 201. The DMA block 203 may be configured to, in response to receiving the workload commands and workload data from the command queues 201, divide the workload data for each of the received commands into a number of job packets. In order to create a stream of job packets for a workload, the DMA may fetch and segment the input workload data, retrieve the control information for the workload, and combine these together into a job packet according to the specifications of specified FFEs which are to be used for processing the job packets.

In one embodiment, each of the commands in the workload may be associated with a particular FFE; for example, the command may indicate an FFE to be used for processing the workload data associated with the command. In one embodiment, the DMA block 203 may identify the particular FFE associated with the command based on control information, workload data, or some other indication. In response to identifying the FFE that is to process the data associated with the command, the DMA block 203 may then determine how to arrange the workload data and control information into a job packet according to a format that can be processed by the FFE.

For example, a job packet destined for an FFE that is configured to perform AES encryption may include a set of input data, an AES key, and a flag indicating whether encryption or decryption is to be performed by the FFE. The DMA block 203 may also add metadata to the job packet; for example, the job packet may include a header containing flags indicating whether the job packet is the first or last job packet of a command, or containing fields indicating the length of the data payload of the job packet.

In one embodiment, the DMA block 203 may also add a command queue identification (ID) tag to each job packet of a command identifying the command or the command queue from which the job packet originated. Such tagging may facilitate the processing of workstreams that include multiple commands.

In one embodiment, the DMA block 203 generates a series of job packets and stores the job packets in one or more job packet buffers 204. In one embodiment, the buffers 204 may be implemented using FIFO buffers.

In one embodiment, the workload management architecture 200 may also include a job packet manager 205 coupled with the job packet buffers 204. The job packet manager 205 may be configured to assign one or more of the job packets produced by the DMA block 203 and stored in the buffers 204 to one of the FFEs 210. Based on the assignment, the job packet manager 205 may retrieve job packets from the buffers 204 and transmit the job packets to the appropriate one of the FFEs 210 that is coupled with the job packet manager 205.

In one embodiment, the job packet manager 205 may transfer job packets via a switchable interconnect 206 that is coupled with the DMA block 203 directly or through buffers 204. The switchable interconnect 206 may thus couple the DMA block 203 to each of the FFEs 210, so that the job packets produced by the DMA block 203 can be distributed to the different FFEs 210. In one embodiment, the switchable interconnect 206 may be implemented as a cross-bar network.

In one embodiment, when one of the FFEs 210 has available space to accept a new job packet, the job packet manager 205 may arbitrate between the job packets queued in the buffers 204 to identify a job packet to send to the FFE. In one embodiment, priorities may be assigned to the commands in the workstream, the command queues, or to specific job packets to control the allocation of the FFEs' computational bandwidth when conflicts arise.

In one embodiment, when one of the command queues 201 has run out of data (underflowed) then the command queue may stall until more data has been stored in the command queue, and a job packet created from that data. The DMA block 203 may ignore the underflowed command queue and only arbitrate between command queues that have work packets ready to queue. In one embodiment, allocation of the FFEs' computational bandwidth may be performed on an arbitration cycle basis and may be based upon the priorities of just the command queues having job packets ready to be distributed to the FFEs 210.

Accordingly, each of the FFEs 210 may be configured to receive one or more of the job packets and generate one or more output packets based on the workload data in the received one or more job packets. For example, a FFE may receive a job packet, then perform a function on the workload data in the packet, in accord with control information or function parameters also contained within the job packet. The FFE may then generate an output packet containing the output data resulting from performing the function. In one embodiment, an FFE may generate one output packet for each job packet that is processed by the FFE.

In one embodiment, each of the FFEs 210 may include an input FIFO buffer for queuing job packets that have been assigned to the corresponding FFE. Thus, each input FIFO buffer queues job packets for a different one of the FFEs 210. In order to process a job packet, an FFE may receive the job packet in its input FIFO buffer, and may then process the job packet after processing any preceding job packets in the input FIFO buffer. In one embodiment, each FFE processes a single job packet at a time; however, the multiple FFEs 210 may process job packets in parallel.

In one embodiment, each of the FFEs 210 may include an arrangement of logic gates, memory cells, and/or other devices arranged to perform a specific calculation or function using the input data and other information in the job packets. Alternatively, the functions of the FFEs 210 may be implemented using software or firmware that is executed using a processor.

In one embodiment, each of the FFEs 210 may be configured to perform a different set of calculations from any of the other FFEs. For example, a first FFE 210-1 may perform a first set of calculations for AES encryption while a second FFE 210-2 performs a different set of calculations to implement SHA encryption. Alternatively, some of the FFEs 210 may be redundant, such that two or more of the FFEs 210 perform the same or similar function, or perform the same or similar sets of calculations.

In one embodiment, the time durations taken by each of the FFEs 210 to finish processing a job packet may vary. For example, FFE 210-1 may take less time to process a job packet than FFE 210-2.

In one embodiment, when processing job packets, each FFE may identify ordering information in the job packets and copy the ordering information into the corresponding output packets generated by the FFE. In one embodiment, the ordering information indicates the original order of the job packets, and further indicates an order in which the output data in the output packets is to be arranged when assembling the output data stream.

In one embodiment where the DMA block 203 has added to each job packet a command queue ID tag identifying the command queue from which the job packet originated, each FFE may be further configured to copy the tag from the job packet to its corresponding output packet. In one embodiment, the FFE copies the tag into the output packet when the FFE queues the output packet in one of the output packet buffers 207.

In one embodiment, each of the FFEs 210 may be coupled with one of a set of output packet buffers 207. Each of the output packet buffers 207 may be configured to receive the output packets generated by the FFEs 210 and queue the output packets prior to assembly into an output data stream. In one embodiment, the switch 208 may be used to selectively couple one of the output packet buffers 207 to the DMA block 203 so that the DMA block 203 can retrieve one or more output packets from the selected output packet buffer.

In one embodiment, the DMA block 203 may assemble the output data from the received output packets into an output data stream. In one embodiment, the DMA block 203 uses the command queue ID tag to identify output packets belonging to a particular command queue and to combine those packets together into an output buffer for the specified command queue.

The output packets may be assembled in an order indicated by the ordering information in one or more of the output packets. In one embodiment, the output data stream may include the payload data from the output data packets while excluding some or all of the metadata contained in the output data packets.

In one embodiment, the output data stream may be stored in memory by the DMA via memory interface 202. For example, the output data may be stored in memory 120, illustrated in FIG. 1.

Figure 3A:
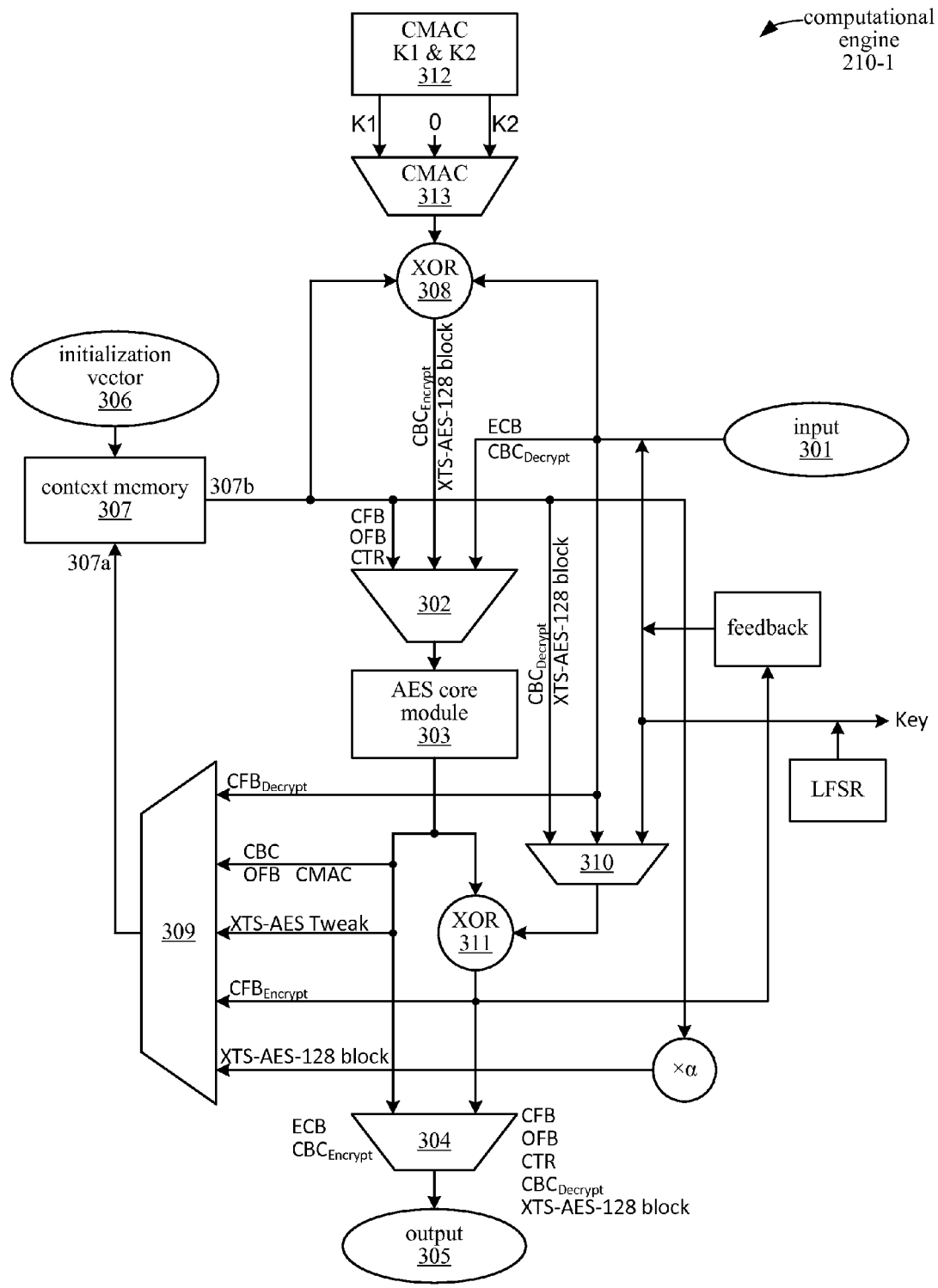
FIG. 3A illustrates an embodiment of a computational engine, according to an embodiment.

FIG. 3A illustrates in more detail an embodiment of an FFE 210-1. In one embodiment, FFE 210-1 may be an AES computational engine which may perform encryption and decryption of workload data using AES cryptographic operations. In one embodiment, the computational engine 210-1 may support encryption and decryption according to one or more AES cipher modes, such as ECB, CBC, CFB, etc.

In one embodiment, the computational engine 210-1 may receive job packets from a job packet manager 205 at an input 301. The received job packets may include workload data associated with different commands and stored in different command queues. For example, a first job packet received at the input 301 may be from a first command in a first command queue, while a second subsequent job packet may be from a second command in a second command queue different from the first command queue.

In one embodiment, the computational engine 210-1 may, in response to receiving the job packets, generate an output data packet corresponding to each received job packet based on the payload data and metadata (such as the command queue ID) in the job packet, and also based on data stored in a context corresponding to the command queue of the job packet. In one embodiment, the correct context may be selected based on the command queue ID of the job packet. In alternative embodiments, the context may be selected based on criteria other than the command queue. For example, in an embodiment where the processing of job packets is scheduled, contexts may be selected based on timing information.

In one embodiment, contexts may be stored in a context memory 307. In one embodiment, each context may include internal state data that is used during the execution of one or more of the supported AES cipher modes. For example, encryption according to the AES Cipher-block chaining (CBC) mode provides for an XOR operation between the plaintext to be encrypted and the resulting ciphertext from the previously encrypted block. A context may thus be used to store the ciphertext for the previous block so that the computational engine 210-1 may switch to a different job, then return to the CBC job and continue processing by retrieving the correct ciphertext from the context memory 307.

In one embodiment, the computational engine 210-1 may be an AES engine that updates a context for each 16-byte block of data that it processes, when operating according to a cipher mode that uses intermediate or final values calculated from cryptographic operations performed on previous blocks. In one embodiment, the context memory 307 may thus store several contexts so that the engine 210-1 may manage the execution of multiple heterogeneous AES workloads. In one embodiment, each AES workload may be uniquely tagged to individually specify the AES cipher mode to be utilized. In one embodiment, the individual contexts may be externally accessible so that software can save and restore individual contexts. This may allow such software to schedule arbitrary workloads within a single context and overcome any hardware imposed virtualization limits.

Figure 3B:
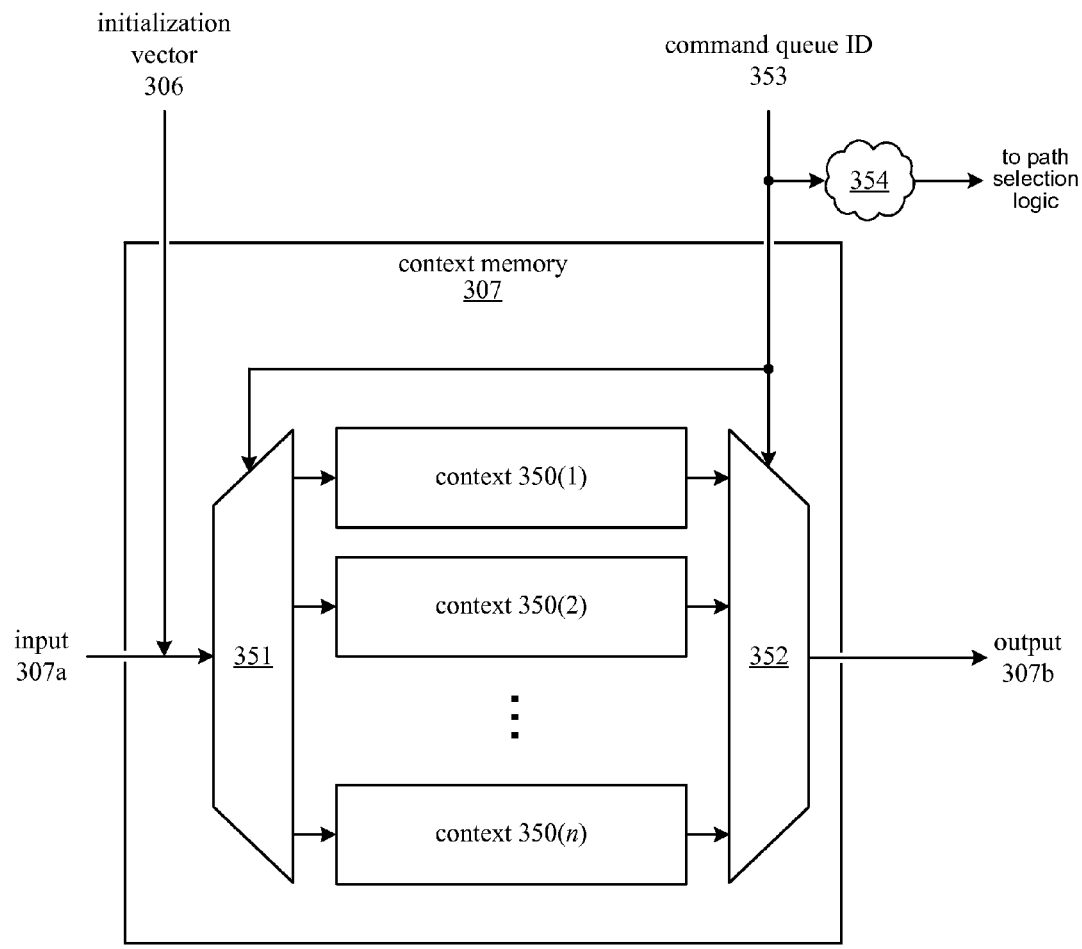
FIG. 3B illustrates an embodiment of a context memory, according to an embodiment.

FIG. 3B illustrates a context memory 307 of a computational engine 210-1 that is configured to store one or more contexts, according to one embodiment. As illustrated in FIG. 3B, the context memory 307 stores contexts 350(1)-350(n). Each of the contexts 350(1)-350(n) may correspond to one of n command queues, such as command queues 201. Each of these contexts may store, for example, one or more intermediate values or final values from the execution of a sequence of cryptographic operations on workload data. In one embodiment, an intermediate value may be a value generated by a subset of cryptographic operations out of a sequence of cryptographic operations for encrypting or decrypting a block of data according to one of the AES cipher modes.

In one embodiment, a computational engine 201-1 that executes several sequences of cryptographic operations to process multiple job packets, the context memory 307 may be used to store a context for each time one of these sequences of cryptographic operations is executed. In one embodiment, the context memory 307 may be used to store contexts for some sequences and not others. For example, a first sequence of cryptographic operations may be used to implement an AES Electronic Code Book (ECB) mode, which does not need to store any intermediate or final values in a context, while a second sequence of cryptographic operations may be used to implement an AES Cipher-block Chaining (CBC) mode, for which a context may be stored.

In one embodiment, the context memory 307 may include context selection logic including multiplexer 351 and demultiplexer 352 for selecting a current context out of the contexts 350. In one embodiment, the context selection logic 351 and 352 may select a different context for each unique command queue. In one embodiment, the selection may be maintained for the duration of execution of the sequence of cryptographic operations on the current job packet. In one embodiment, the selection logic 351 and 352 may maintain the selection for at least the time during which the context memory 307 is being accessed.

In one embodiment, an initialization vector 306 may be connected to the input 307a of the context memory so that an initial value may be stored in one of the contexts 350. For some cipher modes, this initial value may be used for operations on an initial block of input data to produce distinct ciphertexts even when the same plaintext is encrypted.

In one embodiment, the context selection logic 351 and 352 may select a current context by coupling the context with an input 307a and an output 307b, respectively, of the memory 307. In one embodiment, the context selection logic 351 and 352 may select a current context in response to receiving a command queue ID 353 of a packet currently being processed by the computational engine 201-1 at the time of the selection, and may select a context corresponding to the received command queue ID 353.

In one embodiment, the command queue ID 353 may additionally be processed by logic 354 and used to control computational elements having path selection logic to select a computational pathway for implementing the appropriate cipher mode for the packet being processed. In one embodiment, the logic 354 may include memory and other logic for correlating the received command queue ID 353 with the appropriate cipher mode, and for generating the signals to switch the path selection logic elements accordingly.

Referring back to FIG. 3A, the computational engine 210-1 may also include a set of computational elements coupled with the input 301 and coupled with the input 307a and output 307b of the context memory 307. These computational elements may include an AES encryption core module 303, XOR modules 308, 311, multiplexers 302, 304, 309, 310, CMAC key generator 312, and CMAC key selector 313, for example.

In one embodiment, each of the computational elements in the engine 210-1 may be coupled with at least another one of the computational elements. Each of the computational elements may perform one or more cryptographic operations; for example, the XOR modules 308 and 311 may perform bitwise XOR operations which may be used to process input data according to one or more of the supported cipher modes. Some computational elements, such as the XOR modules, may be used by the processes of multiple different cipher modes, while other computational elements, such as the CMAC modules 312 and 313, may be used by only one supported cipher mode.

In one embodiment, the set of computational elements may include a cryptographic core module, such as the AES core module 303. In one embodiment, the cryptographic core module may perform a sequence of operations that is common to all or most of the supported cipher modes. For example, the AES core module 303 may perform a set of AES operations that is common to all of the AES cipher modes. Thus, in an embodiment where each cipher mode is implemented by its own particular sequence of cryptographic operations executable by the computational engine 210-1, the cryptographic core module 303 may be responsible for executing the same subset of operations within each cipher mode's sequence of operations.

In one embodiment, one or more of the elements in the set of computational elements may include path selection logic for selecting computational pathways for implementing each of the different supported cipher modes. With reference to FIG. 3A, for example, the multiplexers 302, 304, 309, and 310 may include such path selection logic, and may be used to connect a subset including some or all of the other computational elements in the appropriate order for executing the sequences of cryptographic operations for implementing the supported cipher modes.

In one embodiment, each of the elements having path selection logic may select a computational pathway or a portion of a computational pathway in response to the command queue ID of the packet currently being processed by the engine 210-1. In one embodiment, the command queue ID may be correlated to one of the supported cipher modes, which may in turn indicate the appropriate computational pathways to be selected by the path selection logic elements.

In one embodiment, once the computational pathway has been selected, the selected computational elements may generate an output data packet based on the input packet by performing the appropriate sequence of cryptographic operations on the input packet data.

In one embodiment, the path selection logic may be used to select computational pathways for implementing various cipher modes; for example, the computational pathways may be selected to support one or more National Institute of Standards and Technology (NIST) approved AES cipher modes, such as ECB, CBC, CFB, OFB, etc. In one embodiment, even though different computational pathways support different cipher modes, some computational elements may be included in two or more different pathways corresponding to different cipher modes.

Figure 4:
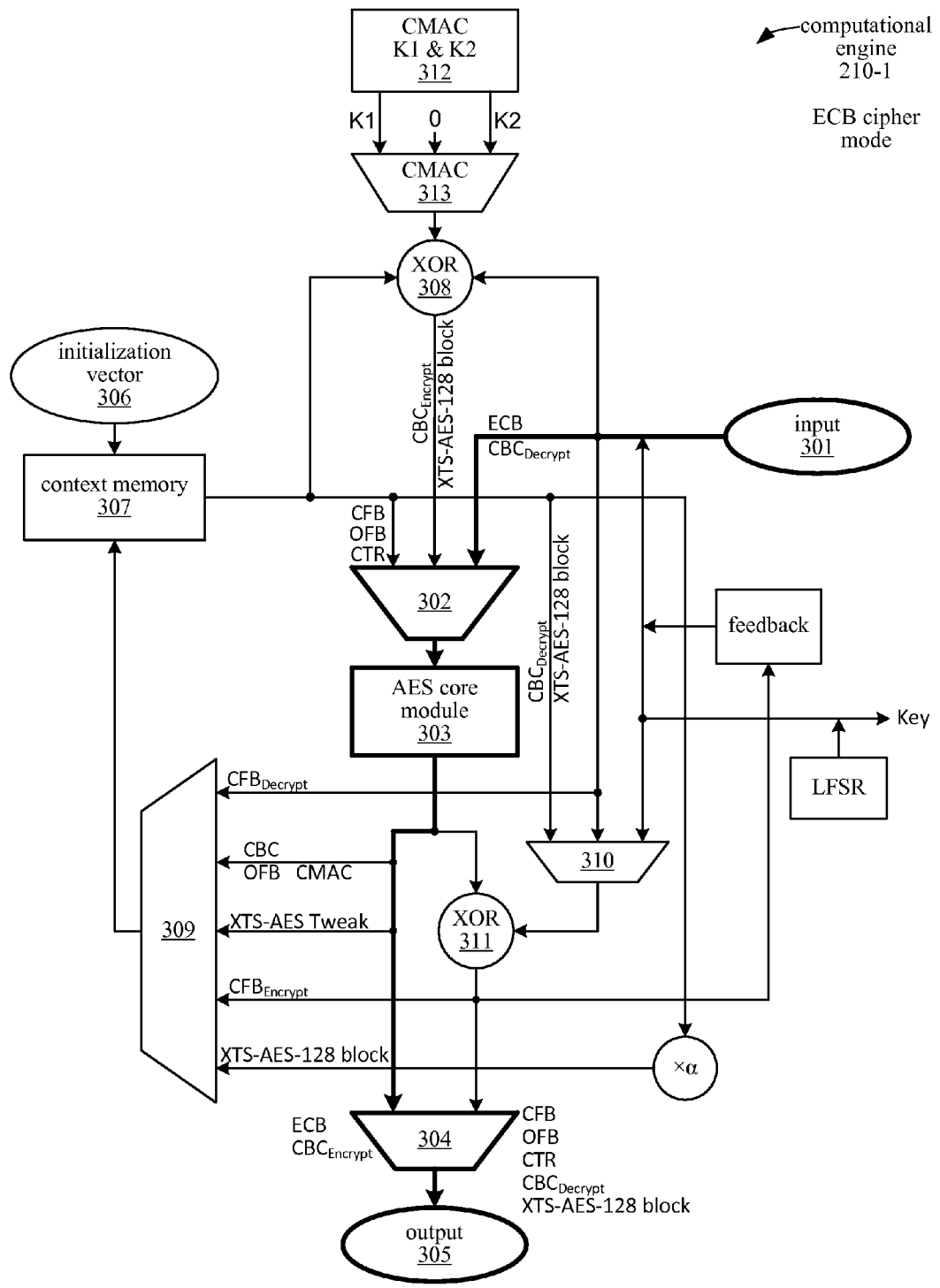
FIG. 4 illustrates a computational pathway for implementing an Electronic Codebook (ECB) cipher mode in a computational engine, according to an embodiment.

FIG. 4 illustrates a computational pathway for implementing the Electronic Codebook (ECB) cipher mode in a computational engine 210-1, according to one embodiment. This selected computational pathway is illustrated with bold lines in FIG. 4. The computational pathway for the ECB cipher mode begins with the input 301 and includes the computational elements 302, 303, and 304, and ends at output 305.

In one embodiment, the path selection logic may exclude the context memory from a one or more computational pathways; for example, the path selection logic excludes the context memory 307 from the computational pathway for the ECB cipher mode because the ECB process for encrypting or decrypting a block does not use any intermediate or final values from previously processed blocks.

Figure 5A:
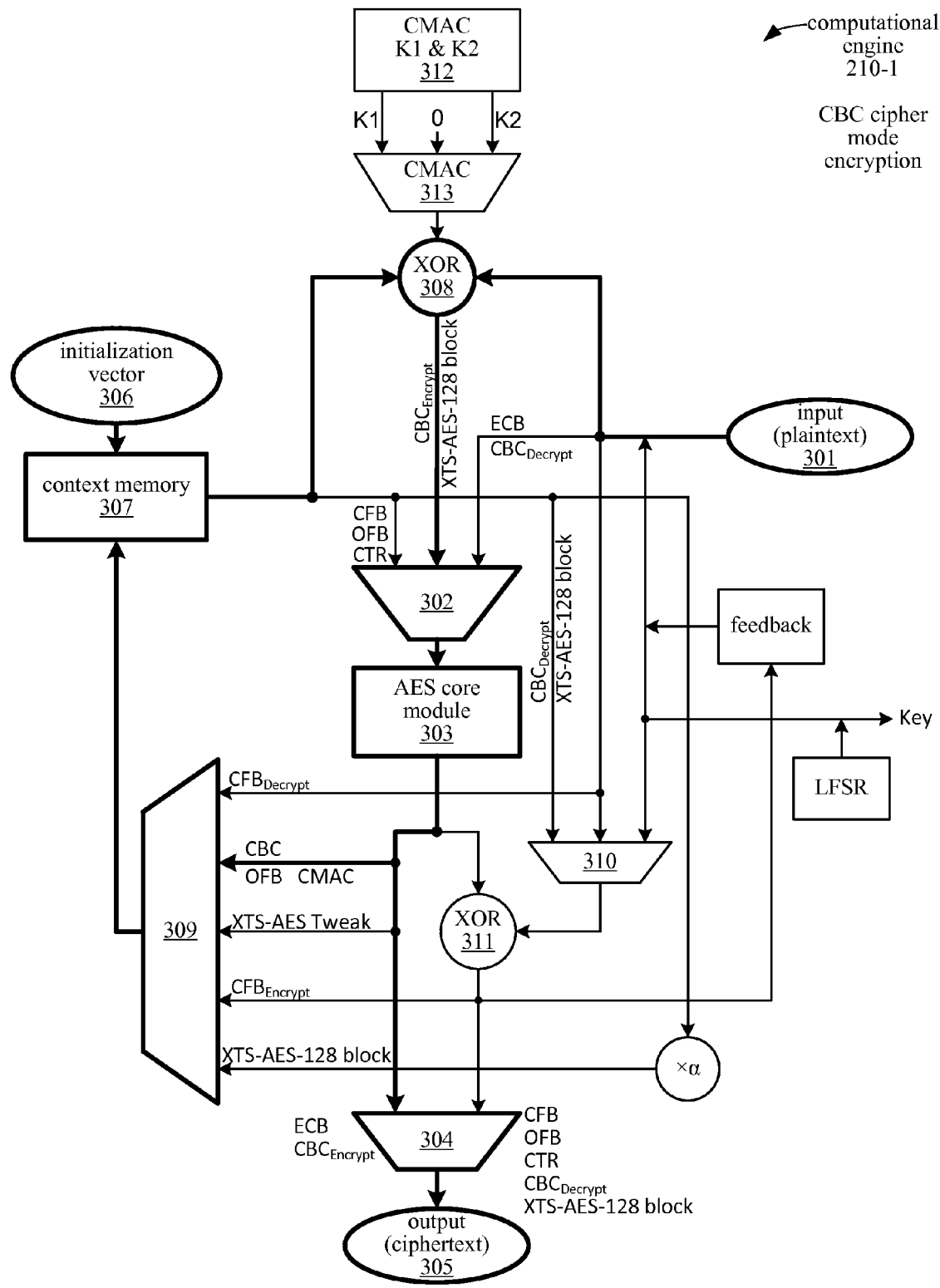
FIG. 5A illustrates a computational pathway for implementing Cipher Block Chaining (CBC) cipher mode encryption in a computational engine, according to an embodiment.

FIG. 5A illustrates a computational pathway for implementing the encryption process of the Cipher-block Chaining (CBC) cipher mode in a computational engine 210-1, according to one embodiment. This selected computational pathway is illustrated with bold lines in FIG. 5A. The computational pathway for CBC cipher mode encryption begins with plaintext at the input 301 and includes the computational elements 302, 303, and 304, 309, 307, 308 and ends at output 305 with the generated output ciphertext. Initialization vector 306 may be used to initialize the context memory 307 with an initial value for the first block of plaintext data to be encrypted.

Figure 5B:
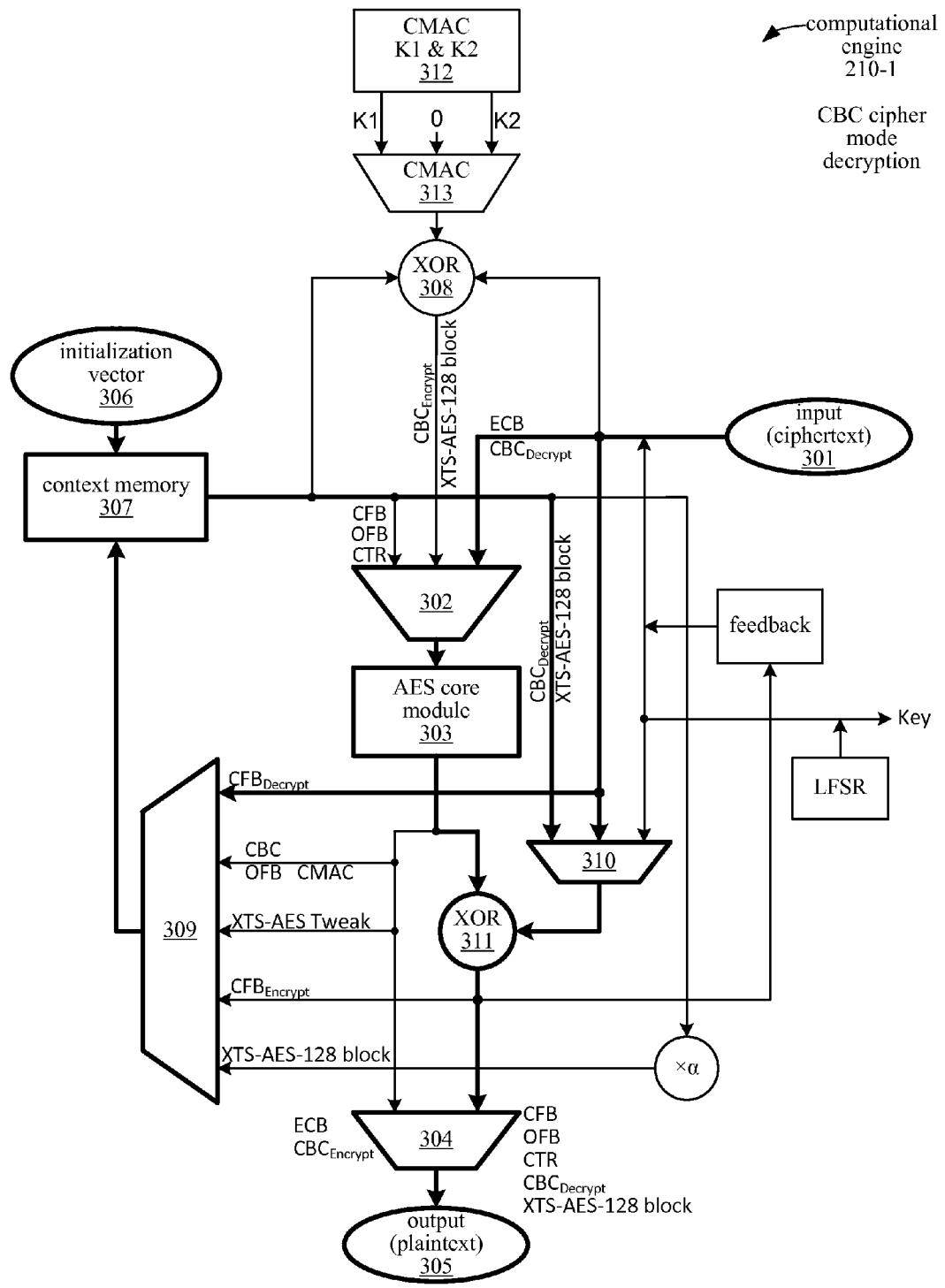
FIG. 5B illustrates a computational pathway for implementing CBC cipher mode decryption in a computational engine, according to an embodiment.

FIG. 5B illustrates a computational pathway for implementing the decryption process of the CBC cipher mode in a computational engine 210-1, according to one embodiment. This selected computational pathway is illustrated with bold lines in FIG. 5B. The computational pathway for CBC cipher mode decryption begins with ciphertext at the input 301 and includes the computational elements 302, 303, and 304, 307, 309, 310, 311, and ends at output 305 with the generated output plaintext. Initialization vector 306 may be used to initialize the context memory 307 with an initial value for the first block of ciphertext data to be decrypted.

Figure 6A:
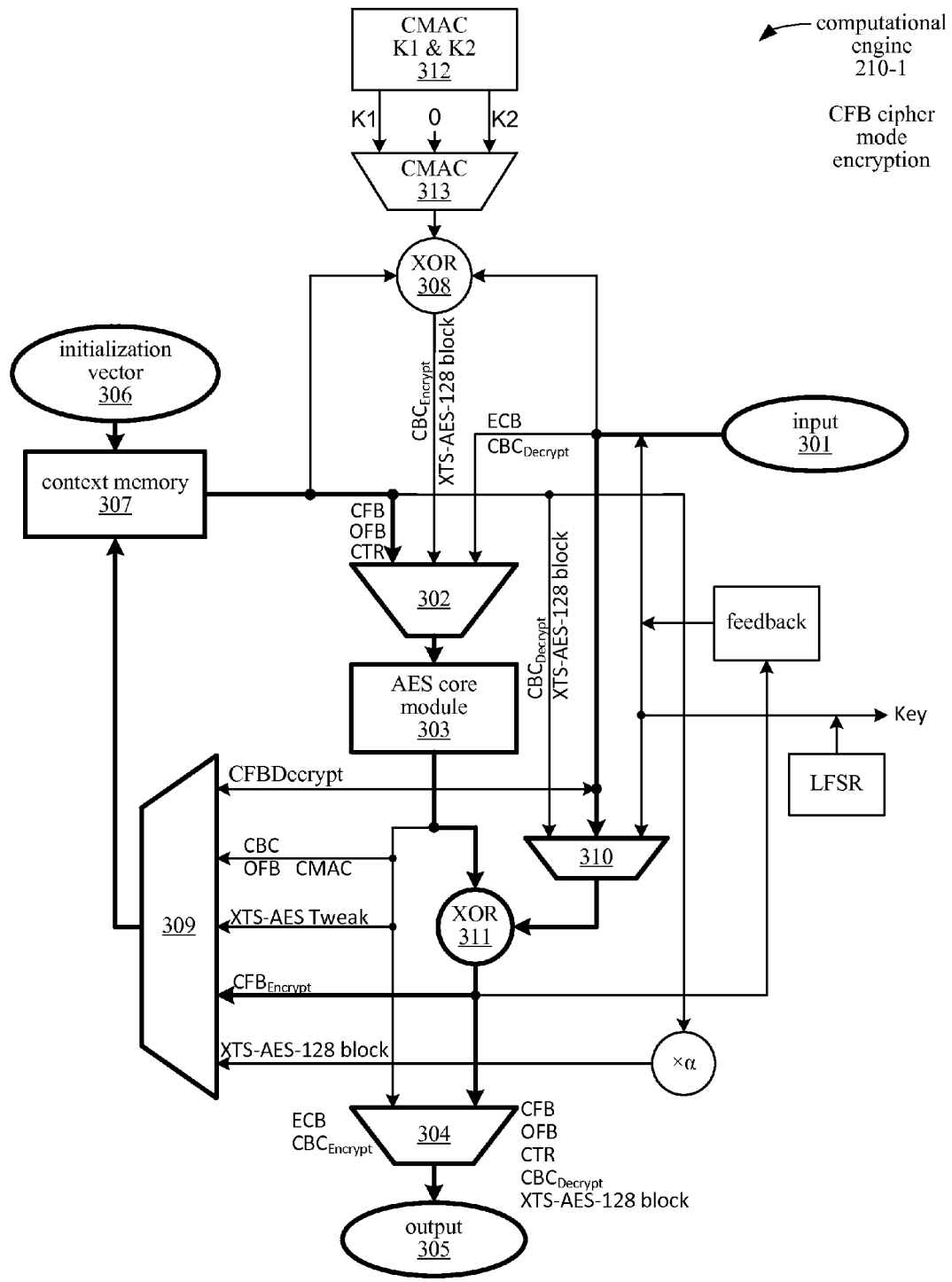
FIG. 6A illustrates a computational pathway for implementing a Cipher Feedback (CFB) encryption cipher mode in a computational engine, according to an embodiment.

FIG. 6A illustrates a computational pathway for implementing the Cipher Feedback (CFB) encryption cipher mode in a computational engine 210-1, according to an embodiment. This selected computational pathway is illustrated with bold lines in FIG. 6A. The computational pathway for CFB cipher mode encryption begins with the input 301 and includes the computational elements 301, 302, 303, 304, 306, 307, 309, 310, and 311, and ends at output 305. Initialization vector 306 may be used to initialize the context memory 307 with an initial value for the first block of data to be processed.

Figure 6B:
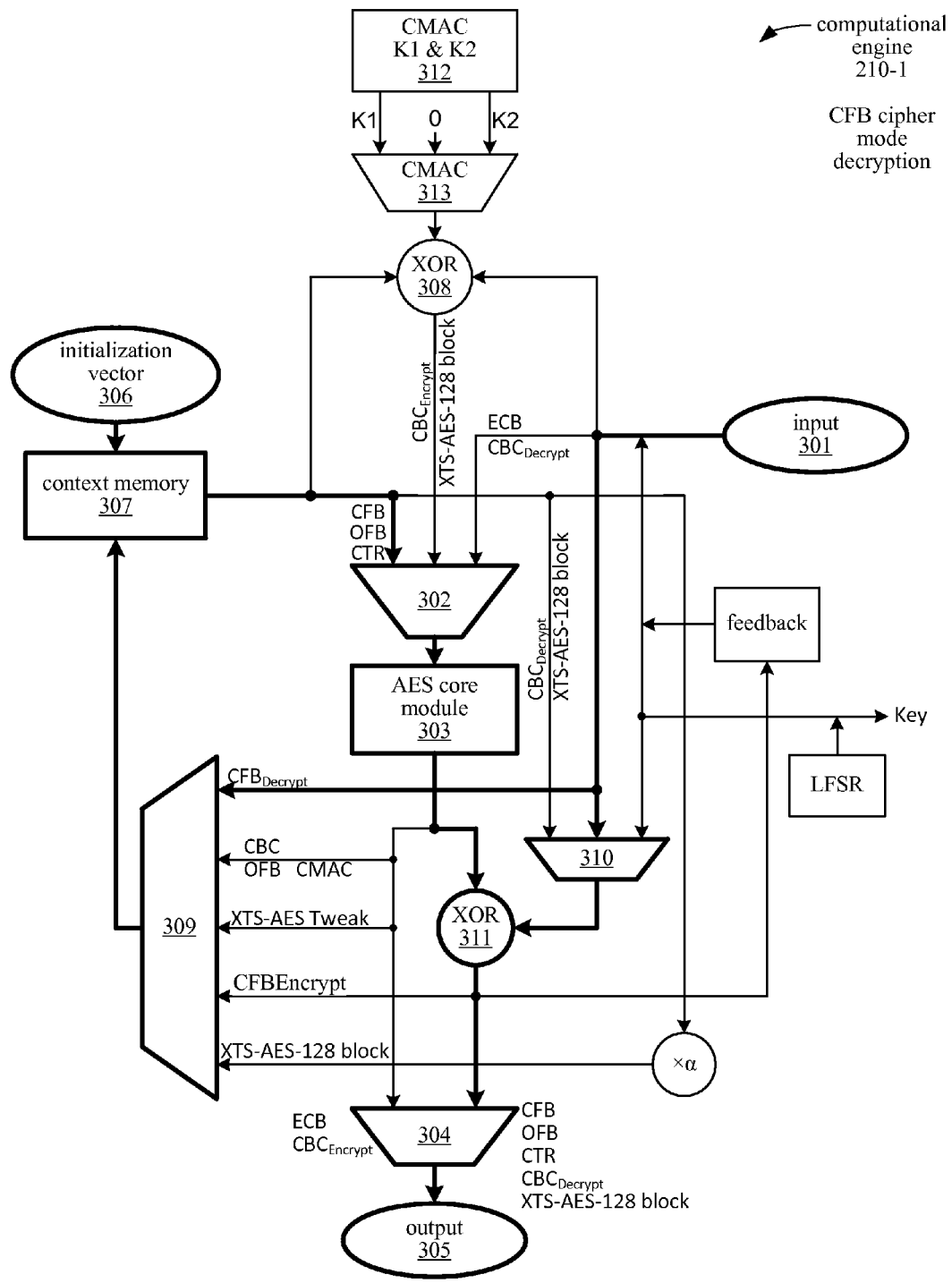
FIG. 6B illustrates a computational pathway for implementing a CFB decryption cipher mode in a computational engine, according to an embodiment.

FIG. 6B illustrates a computational pathway for implementing the Cipher Feedback (CFB) decryption cipher mode in a computational engine 210-1, according to an embodiment. This selected computational pathway is illustrated with bold lines in FIG. 6B. The computational pathway for CFB cipher mode encryption begins with the input 301 and includes the computational elements 301, 302, 303, 304, 306, 307, 309, 310, and 311, and ends at output 305. The computational pathway for the CFB decryption cipher mode differs from the CFB encryption cipher mode in that the $CFB_{Decrypt}$ pathway is selected by the multiplexer 309 instead of the $CFB_{Encrypt}$ pathway to be connected to the context memory 307. Initialization vector 306 may be used to initialize the context memory 307 with an initial value for the first block of data to be processed.

Figure 7:
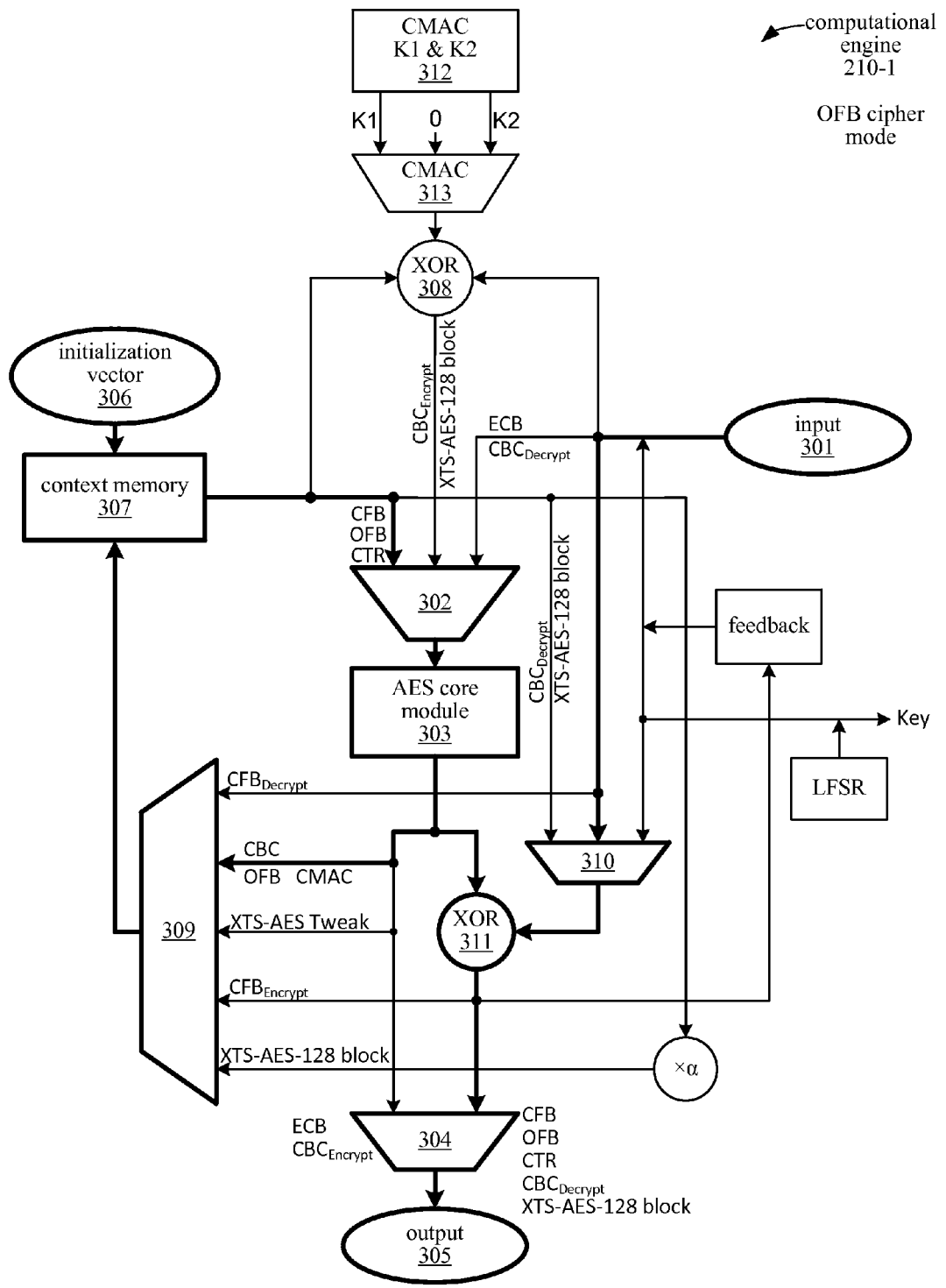
FIG. 7 illustrates a computational pathway for implementing an Output Feedback (OFB) cipher mode in a computational engine, according to an embodiment.

FIG. 7 illustrates a computational pathway for implementing the Output Feedback (OFB) cipher mode in a computational engine 210-1, according to one embodiment. This selected computational pathway is illustrated with bold lines in FIG. 7. The computational pathway for the OFB cipher mode begins with the input 301 and includes the computational elements 301, 302, 303, 304, 307, 309, 310, 311, and ends at output 305. Initialization vector 306 may be used to initialize the context memory 307 with an initial value for the first block of data to be processed.

Figure 8:
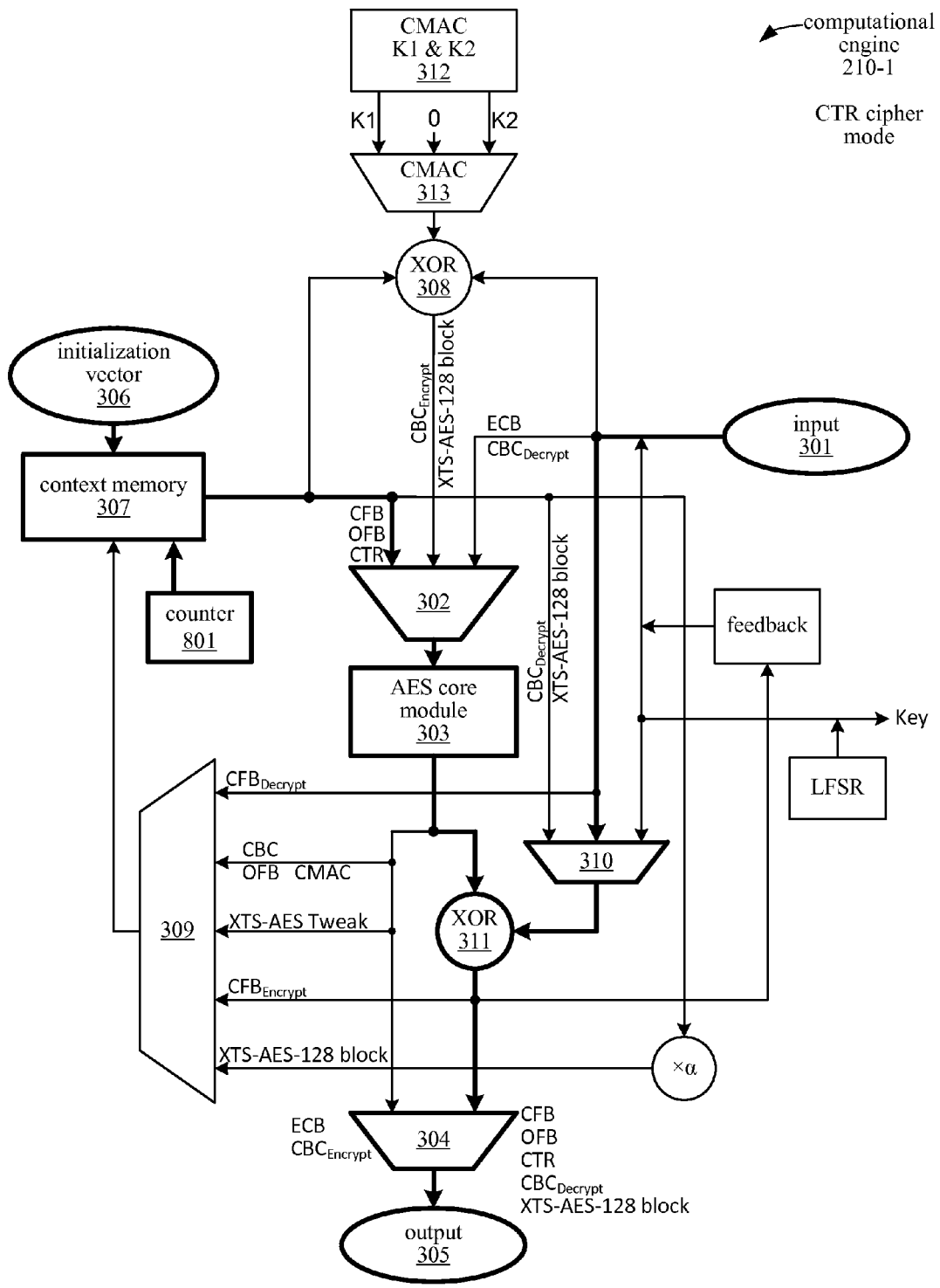
FIG. 8 illustrates a computational pathway for implementing a Counter (CTR) cipher mode in a computational engine, according to an embodiment.

FIG. 8 illustrates a computational pathway for implementing the Counter (CTR) cipher mode in a computational engine 210-1, according to one embodiment. This selected computational pathway is illustrated with bold lines in FIG. 8. The computational pathway for the CTR cipher mode begins with the input 301 and includes the computational elements 302, 303, 304, 307, 310, and 311, and ends at output 305. Initialization vector 306 may be used to initialize the context memory 307 with an initial value for the first block of data to be processed. In one embodiment, a counter 801 may also be connected with the context memory 307 for the CTR cipher mode. The counter 801 may be used to update a count value stored in the context memory 307.

Figure 9:
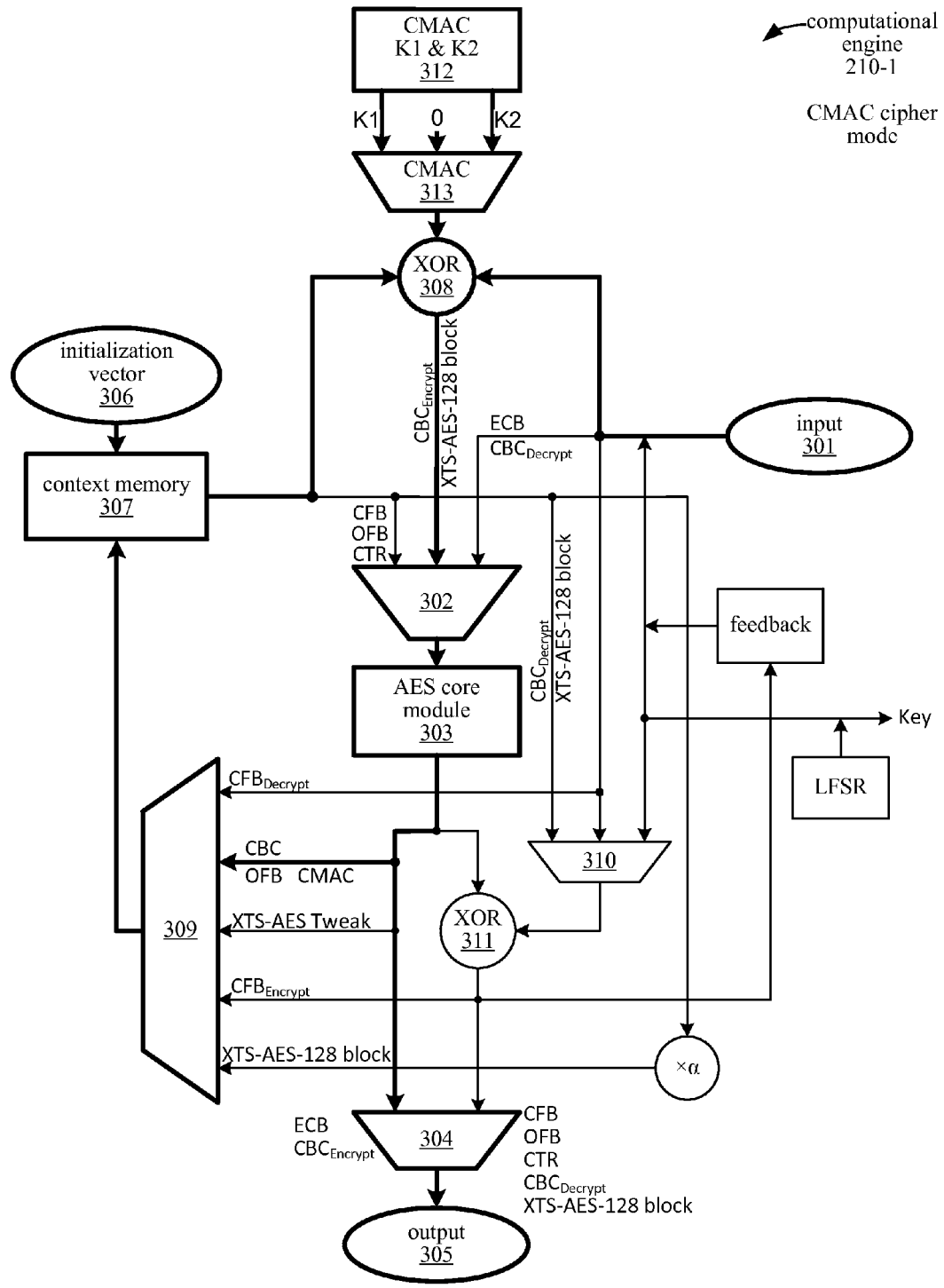
FIG. 9 illustrates a computational pathway for implementing a Cipher-based Message Authentication Code (CMAC) cipher mode in a computational engine, according to an embodiment.

FIG. 9 illustrates a computational pathway for implementing the Cipher-based Message Authentication Code (CMAC) cipher mode in a computational engine 210-1, according to one embodiment. This selected computational pathway is illustrated with bold lines in FIG. 9. The computational pathway for the CMAC cipher mode begins with the input 301 and includes the computational elements 302, 303, 304, 307, 308, 309, 312, and 313 and ends at output 305. Initialization vector 306 may be used to initialize the context memory 307 with an initial value for the first block of data to be processed. In one embodiment, the computational pathway for the CMAC cipher mode may include a sub-key generator 312 for generating keys K1 and K2, and a CMAC key selector 313.

Figure 10A:
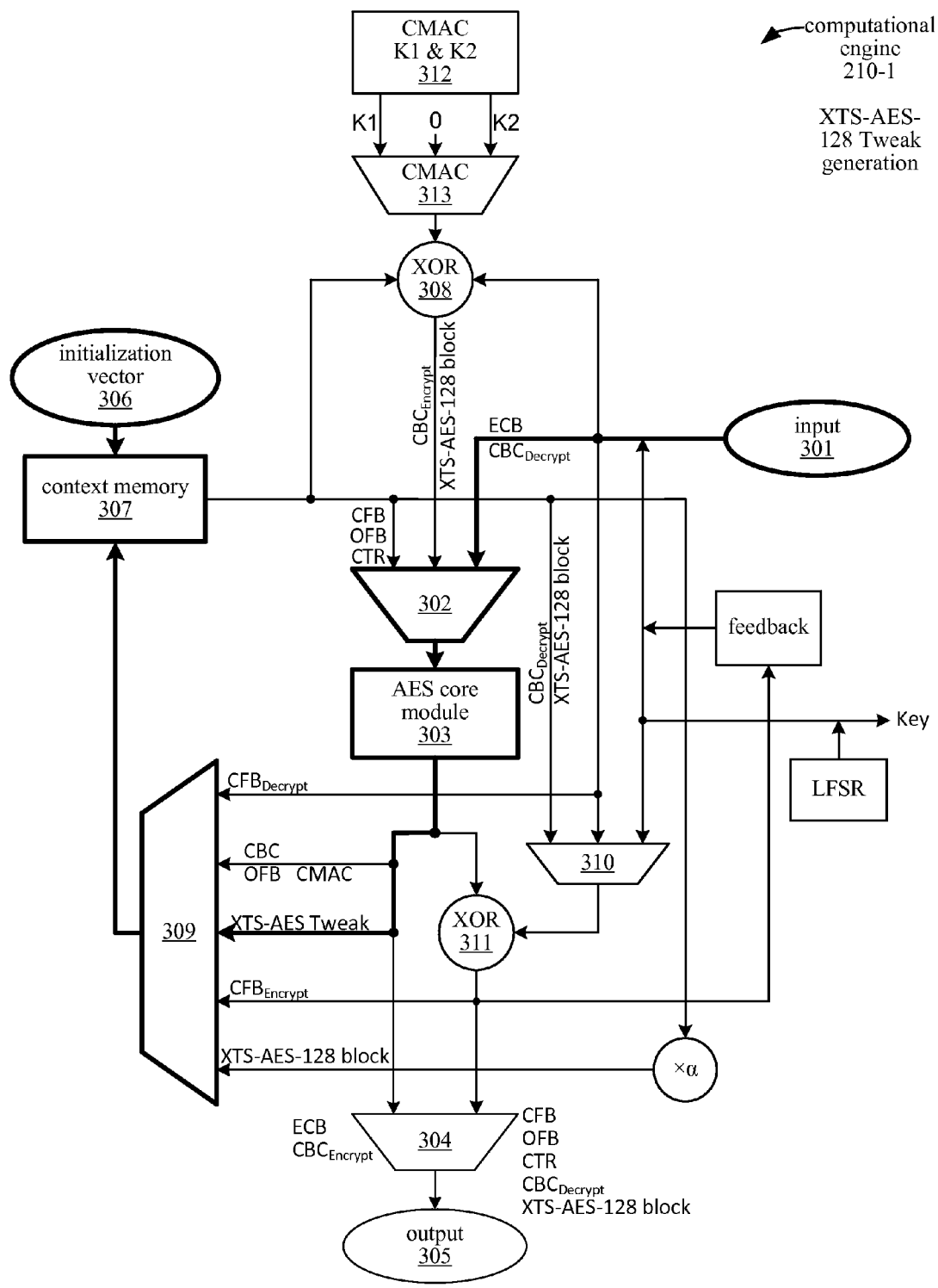
FIG. 10A illustrates a computational pathway for implementing a 128-bit "XOR Encrypt XOR" Tweakable Block Cipher with Ciphertext Stealing (XTS-AES-128 Tweak) cipher mode for Tweak generation in a computational engine, according to an embodiment.

FIG. 10A illustrates a computational pathway for implementing the 128-bit "XOR Encrypt XOR" Tweakable Block Cipher with Ciphertext Stealing (XTS-AES-128) tweak generation cipher mode for in a computational engine 210-1, according to one embodiment. This selected computational pathway is illustrated with bold lines in FIG. 10A. The computational pathway for the XTS-AES-128 tweak generation cipher mode begins with the input 301 and includes the computational elements 302, 303, 309, and 307. Initialization vector 306 may be used to initialize the context memory 307 with an initial value for the first block of data to be processed. The tweak computation outputs one or more tweak values that are stored in the context memory 307 for use in a subsequent XTS-AES-128 encryption or decryption process.

Figure 10B:
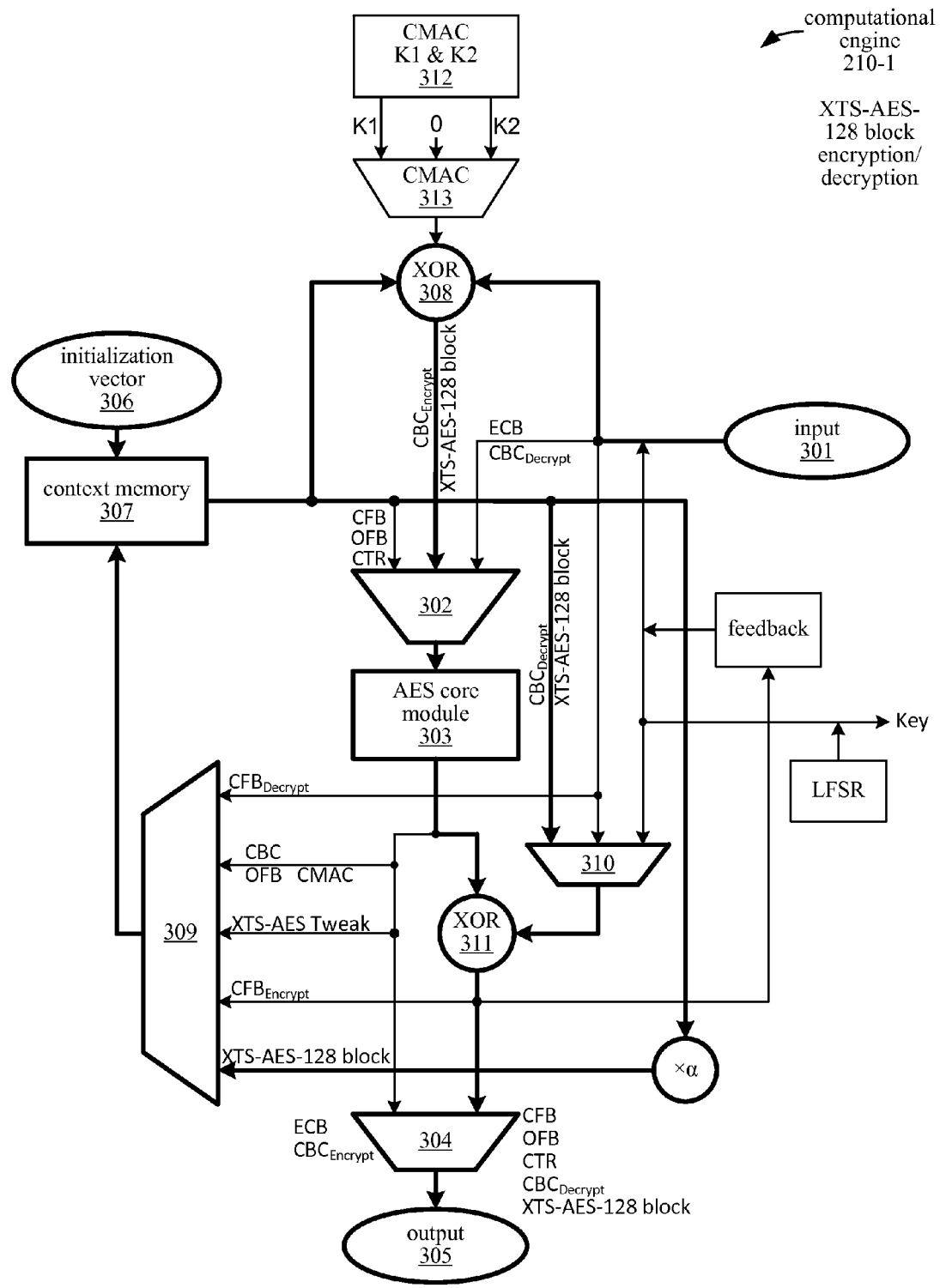
FIG. 10B illustrates a computational pathway for implementing a XTS-AES-128 Tweak cipher mode for block encryption or decryption in a computational engine, according to an embodiment.

FIG. 10B illustrates a computational pathway for implementing the 128-bit XTS-AES-128 block encryption and decryption cipher modes for in a computational engine 210-1, according to one embodiment. The selected computational pathway is the same for both of the XTS-AES-128 encryption and decryption cipher modes, and is illustrated with bold lines in FIG. 10B. This computational pathway begins with the input 301 and includes the computational elements 302, 303, 304, 306, 307, 308, 309, 310, and 311, and ends at output 305. Initialization vector 306 may be used to initialize the context memory 307 with an initial value for the first block of data to be processed. The XTS-AES-128 encryption or decryption process performs encryption or decryption based on one or more tweak values stored in the context memory 307 by the XTS-AES-128 tweak computation process.

Figure 11:
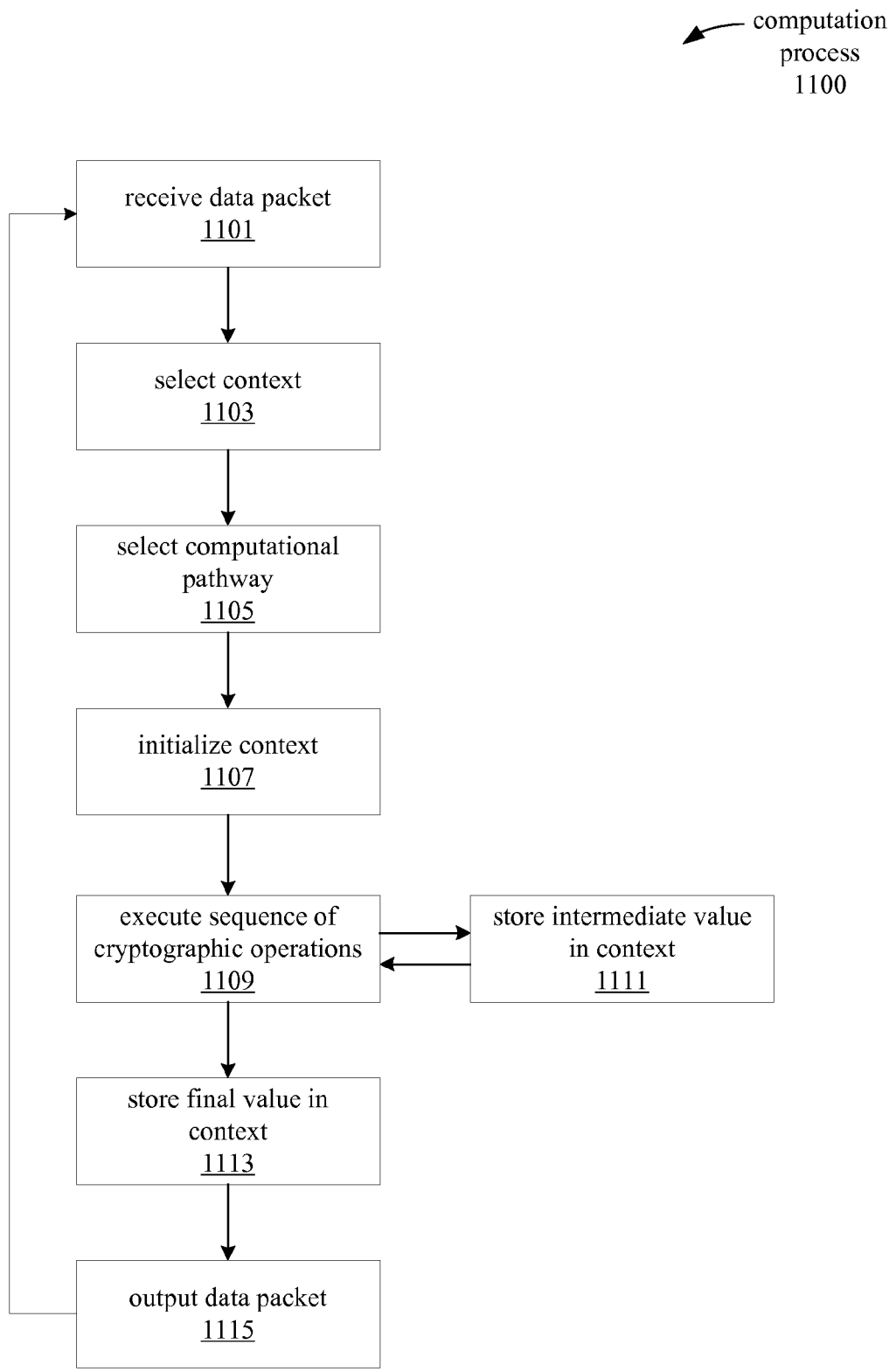
FIG. 11 is a flow diagram illustrating an embodiment of a computation process.

FIG. 11 illustrates a computation process 1100, according to an embodiment. In one embodiment, the operations of process 1100 may be performed by a computational engine such as computational engine 210-1.

In one embodiment, the process 1100 begins at block 1101. At block 1101, the computational engine 210-1 may receive a data packet. In one embodiment, the data packet may be a job packet received at an input 301 of the computational engine 210-1. In one embodiment, the data packet may include both payload data and metadata. In one embodiment, the payload data may be plaintext to be encrypted by the engine 210-1, or ciphertext data to be decrypted by the engine 210-1. The metadata may include information such as a command queue identifier that identifies one of the command queues 201 from which the data packet originates, and may also include information indicating the order in which the output data generated from the data packet should be placed in the output data stream. From block 1101, the process 1100 continues at block 1103.

In one embodiment, the computational engine 210-1 may select a context from the context memory 307 based on the command queue identifier of the received data packet. For example, with reference to FIG. 3B, the command queue ID 353 may be used to control the context selection logic 351 and 352 to select one of the contexts 350 by connecting it with the input 307a and the output 307b of the context memory 307 so that data may be stored in and retrieved from the selected context. In one embodiment, the set of contexts 350 may include a context corresponding to each of the command queues 201. For example, if a command queue ID 353 identifies command queue '2', the context selection logic 351 and 352 may select a corresponding context 350(2). In one embodiment, the context may remain selected for the duration of the execution of the sequence of cryptographic operations. From block 1103, the process 1100 continues at block 1105.

At block 1105, the computational engine 210-1 may select a subset of computational elements in a computational pathway. In one embodiment, the selection of the subset of computational elements may depend on the command queue ID 353. With reference to FIG. 3B, the command queue ID 353 may be transmitted to logic 354, which generates the appropriate signals for controlling the computational elements having path selection logic.

In alternative embodiments, the cipher mode may be identified based on metadata other than the command queue ID; for example, the cipher mode may correspond to a specific command within the command queue, rather than the command queue itself. In an alternative embodiment, the cipher mode may be switched based on timing information or other external signals that are not transmitted as part of the data packet.

In one embodiment, the computational elements having path selection logic that are used to select the computational pathway may include, for example, multiplexers 302, 304, 309, and 310; thus, the logic 354 may identify the cipher mode based on the received command queue ID 353, then cause the multiplexers 302, 304, 309, and 310 to couple together the selected subset of computational elements that will be used to perform the sequence of cryptographic operations for implementing the identified cipher mode.

FIGS. 5A-10 illustrate computational pathways for each of a number of NIST approved AES cipher modes supported by the computational engine 210-1, according to an embodiment. In one embodiment, for one or more of the supported cipher modes, the computational pathway may exclude the context memory 307; for example, the ECB mode illustrated in FIG. 4 does not use the context memory 307. For other supported cipher modes, the computational pathway may include the context memory 307. From block 1105, the process 1100 continues at block 1107.

At block 1107, the computational engine 210-1 may initialize the context memory 307 using an initialization vector 306. For example, an initialization vector 306 may store initial values in the context memory to be used for processing the initial blocks of input data for some cipher modes. The initialization vector 306 may be used, for example, to initialize the context memory 307 when encrypting the first block of plaintext data according to a CBC cipher mode. In other cipher modes, the initialization vector 306 may not be needed; for example, the initialization vector may not be used when encrypting or decrypting data according to the ECB cipher mode. From block 1107, the process 100 continues at block 1109.

At block 1109, after the path selection logic has selected the computational pathway be coupling together a subset of computational elements in the computational engine 210-1, each computational element in the pathway may be used to execute one or more cryptographic operations of a particular sequence of cryptographic operations for implementing the encryption or decryption of the input data according to the cipher mode. For example, the XOR computational element 311 may be used to perform an XOR operation for cipher modes that include an XOR operation. In one embodiment, the AES core module 303 may be used to perform a core set of cryptographic operations that are common to all of the supported cipher modes.

In one embodiment, the computational elements in the selected pathway generate an output data at the output 305 corresponding to the input data received at the input 301 by the execution of the sequence of cryptographic operations on the input data. In one embodiment, the input data may be the payload data of an input data packet, and the output data may be the payload data in an output data packet.

During the execution of the sequence of cryptographic operations at block 1109, the computational engine may generate one or more intermediate values. Depending on the cipher mode that is being used, the one or more intermediate values may be stored in the context memory 307, in the currently selected context, as provided at block 1111. For example, in the OFB cipher mode illustrated in FIG. 7, an intermediate value at the output of the AES core module 303 may be stored via multiplexer 309 into the context memory 307 so that it can be used when encrypting or decrypting a subsequent block.

At block 1113, for other cipher modes, the context memory 307 may be used to store a final value resulting from execution of the sequence of cryptographic operations instead of or in addition to the one or more intermediate values. For example, CFB cipher mode encryption provides that the resulting ciphertext at the output of XOR module 311 is to be used in the encryption process for a subsequent block; thus, the final ciphertext value may be stored via multiplexer 309 in the context memory 307 in the currently selected context so that it can be accessed later. Alternatively, the computational engine may forgo storing any intermediate or final value in the context memory 307 if a cipher mode is used, such as ECB, that does not perform calculations based on such prior values. From block 1113, the process 1100 continues at block 1115. At block 1115, the computational engine 210-1 may output the generated data packet. From block 1115, the process 1100 may continue back to block 1101 to receive a second data packet.

In one embodiment, the processing of the subsequent second data packet may include the operations represented by blocks 1101-1115. The second data packet is received at block 1101. A context may be selected for processing the second data packet based on the command queue identifier of the packet, as provided at block 1103. Accordingly, in one embodiment, if the subsequent data packet is from a different command queue than the previous first packet, a different context may be selected for processing the second data packet.

In some cases, the context selected for the second packet may include intermediate or final values stored prior to the receiving and processing of the previous packet; these intermediate and/or final values may have been generated by the same sequence of cryptographic operations corresponding to the same cipher mode to be used to process the second data packet. In one embodiment, the context may remain selected for the duration of the execution of the sequence of cryptographic operations.

At block 1105, a computational pathway may be selected for processing the second data packet by coupling together a subset of the computational elements. In one embodiment, if the cipher mode to be used for processing the second data packet is different from the cipher mode used to process the first data packet, then the computational pathways may differ. Otherwise, the computational pathway selected for the second data packet may be the same as for the first data packet if the same cipher mode is used for both packets.

At block 117, a context may be initialized by an initialization vector 306 for the second data packet, depending on the cipher mode. At block 1109, the computational elements in the selected pathway may execute a sequence of cryptographic operations, including operations for implementing the selected cipher mode for the second data packet. In one embodiment, when the second data packet is associated with a different cipher mode than the first data packet, the computational pathways may differ; thus, the sequence of cryptographic operations performed by the elements in the computational pathways may also differ.

The computational elements in the selected pathway may generate an output data packet based on executing the sequence of cryptographic operations on the payload data of the second packet and on the stored context. Intermediate and/or final values generated by the sequence of cryptographic operations may be stored in the context memory 307, in accord with blocks 1111 and 1113, so that they may be used for processing subsequent data packets. The final output data packet is output at block 1115.

In one embodiment, the process 1100 may repeat blocks 1101-1115 to process a stream of data packets, and may be capable of switching contexts and/or cipher modes for each sequential data packet that is processed. The computational engine 210-1 may thus process job packets generated from heterogeneous workload data, as provided by the workload management architecture 200.

The embodiments described herein may include various operations. These operations may be performed by hardware components, software, firmware, or a combination thereof. As used herein, the terms "coupled to" or "coupled with" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computational engine 210-1 and/or portions thereof carried on the non-transitory computer-readable medium may be a database or other data structure which can be read by a program and used, directly or indirectly, to fabricate the hardware comprising the computational engine 210-1. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computational engine 210-1. The netlist may then be placed and routed to produce a data set describing geometric shapes to be applied to masks. The masks may then be used in various semiconductor fabrication steps to produce a semiconductor circuit or circuits corresponding to the computational engine 210-1. Alternatively, the database on the non-transitory computer-readable medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodi-

What is claimed is:

1. A computational engine, comprising:
an input configured to receive a first data packet and a second data packet;
a context memory configured to store one or more contexts;
a set of computational elements coupled with the input and coupled with the context memory, wherein the set of computational elements is reconfigurable to execute either of a first sequence of cryptographic operations and a second sequence of cryptographic operations different from the first sequence, wherein the set of computational elements is configured to:
in a first configuration, generate a first output data packet by executing the first sequence of cryptographic operations on the first data packet and a first context of the one or more contexts, wherein the first sequence of cryptographic operations is executed by a first subset of computational elements within the set of computational elements, and
in a second configuration, generate a second output data packet by executing the second sequence of cryptographic operations on the second data packet and on a second context of the one or more contexts, wherein the second sequence of cryptographic operations is executed by a second subset of computational elements within the set of computational elements, wherein the first subset and the second subset of computational elements include at least one computational element in common, wherein the first context is coupled to the first subset of computational elements when the set of computational elements is in the first configuration, and wherein the second context is coupled to the second subset of computational elements when the set of computational elements is in the second configuration, and wherein the selected context is stored in the context memory prior to the execution of the first sequence of cryptographic operations.

2. The computational engine of claim 1, wherein the context memory further comprises context selection logic configured to select a different context for the duration of the execution of each of the first sequence of cryptographic operations and the second sequence of cryptographic operations.

3. The computational engine of claim 1, wherein the first data packet is associated with a first command queue and the second data packet is associated with a second command queue different from the first command queue, and wherein the context memory is configured to select the second context in response to a receiving a command queue identifier for the second packet, wherein the command queue identifier identifies the second command queue.

4. The computational engine of claim 1, wherein the context memory is configured to store in the second context an intermediate value generated by the execution of a subset of operations included in the second sequence of cryptographic operations.

5. The computational engine of claim 1, wherein each of the computational elements is coupled with at least another of the computational elements, and wherein each of the computational elements is configured to execute one or more of the cryptographic operations of the first sequence of cryptographic operations and of the second sequence of cryptographic operations.

6. The computational engine of claim 5, wherein at least one of the computational elements is a cryptographic core module configured to perform a core set of cryptographic operations included in both of the first sequence and the second sequence.

7. The computational engine of claim 6, wherein the core set of cryptographic operations comprises Advanced Encryption Standard (AES) operations.

8. The computational engine of claim 5, wherein one or more of the computational elements comprises path selection logic, wherein for each cipher mode of a plurality of cipher modes supported by the computational engine, the path selection logic is configured to select a computational pathway corresponding to the cipher mode by coupling together a subset of the computational elements.

9. The computational engine of claim 8, wherein the path selection logic is further configured to exclude the context memory from the selected computational pathway for at least one of the plurality of cipher modes.

10. The computational engine of claim 8, wherein the plurality of cipher modes includes one or more National Institute of Standards and Technology (NIST) approved AES cipher modes, and wherein a first computational pathway corresponding to a first cipher mode includes one or more of the same computational elements as a second computational pathway corresponding to a second cipher mode.

11. A method, comprising:
generating a first output data packet by executing in a set of computational elements a first sequence of cryptographic operations on a first data packet and a first context in a context memory while the first subset of computational elements is coupled with the first context, wherein the first sequence of cryptographic operations is executed by a first subset of computational elements within the set of computational elements;
reconfiguring the set of computational elements for executing a second sequence of cryptographic operations by coupling a second context to a second subset of computational elements within the set of computational elements; and
generating a second output data packet by executing in the second subset of computational elements the second sequence of cryptographic operations on a second data packet and on the second context while the second subset of computational elements is coupled with the second context, wherein the second context is stored in the context memory prior to the execution of the first sequence of cryptographic operations, and wherein the first subset and the second subset of computational elements include at least one computational element in common.

12. The method of claim 11, further comprising:
selecting the context from a plurality of contexts in response to a receiving a command queue identifier for the second packet, wherein the command queue identifier identifies a command queue corresponding to the second context; and
selecting a different context for the duration of the execution of the first sequence of cryptographic operations.

13. The method of claim 11, further comprising, prior to execution of the first sequence of cryptographic operations, storing the second context and including in the second context an intermediate value generated from a prior execution of the second sequence of cryptographic operations.

14. The method of claim 11, wherein the first sequence of cryptographic operations includes operations for implementing a first cipher mode, and wherein the second sequence of cryptographic operations includes operations for implementing a second cipher mode different from the first cipher mode, wherein the first cipher mode and the second cipher mode are National Institute of Standards and Technology (NIST) approved AES cipher modes.

15. The method of claim 11, wherein each computational element in the set of computational elements performs one or more of the cryptographic operations of the first sequence of cryptographic operations and of the second sequence of cryptographic operations.

16. The method of claim 15, further comprising:
selecting a first computational pathway by coupling together a first subset of the computational elements prior to executing the first sequence of cryptographic operations; and
selecting a second computational pathway by coupling together a second subset of the computational elements prior to executing the second sequence of cryptographic operations, wherein the second subset of computational elements includes one or more of the same computational elements as the first subset of computational elements.

17. The method of claim 16, further comprising selecting a third computational pathway by coupling together a third subset of the computational elements, while excluding the context memory from the third computational pathway.

18. A system, comprising:
a plurality of command queues each configured to store one or more commands;
a job packet manager coupled with the plurality of command queues; and
a hardware computational engine coupled with the job packet manager and reconfigurable to execute either of a first sequence of cryptographic operations and a second sequence of cryptographic operations different from the first sequence, wherein the first sequence of cryptographic operations is executed by a first subset of computational elements within the hardware computational engine while a first context is coupled with the first subset of computational elements, wherein the second sequence of cryptographic operations is executed by a second subset of computational elements within the hardware computational engine while a second context is coupled with the second subset of computational elements, wherein the first subset and the second subset of computational elements include at least one computational element in common, wherein the job packet manager is configured to distribute each of a plurality of job packets to the hardware computational engine, wherein at least two of the job packets are associated with different command queues, and wherein the hardware computational engine is configured to, for each job packet of the plurality of job packets, generate an output data packet based on the job packet and based on one of the first context and the second context that corresponds to the command queue of the job packet.

19. The system of claim 18, wherein the hardware computational engine comprises:
a set of computational elements including the first subset and the second subset and configured to, for each job packet of the plurality of job packets, generate the output data packet by executing a sequence of cryptographic operations; and
a context memory coupled with the set of computational elements, wherein the context memory is configured to, for each sequence of cryptographic operations, store an intermediate value generated by the sequence of cryptographic operations.

20. The system of claim 19, wherein the context memory further comprises context selection logic configured to select the one of the first context and the second context that corresponds to the command queue of the job packet in response to receiving a command queue identifier identifying the command queue, and wherein at least one of the computational elements in the set of computational elements comprises path selection logic, wherein for each cipher mode of a plurality of cipher modes supported by the hardware computational engine, the path selection logic is configured to select a computational pathway corresponding to the cipher mode by coupling together a subset of the computational elements.

* * * * *